United States Patent Office 3,045,055
Patented July 17, 1962

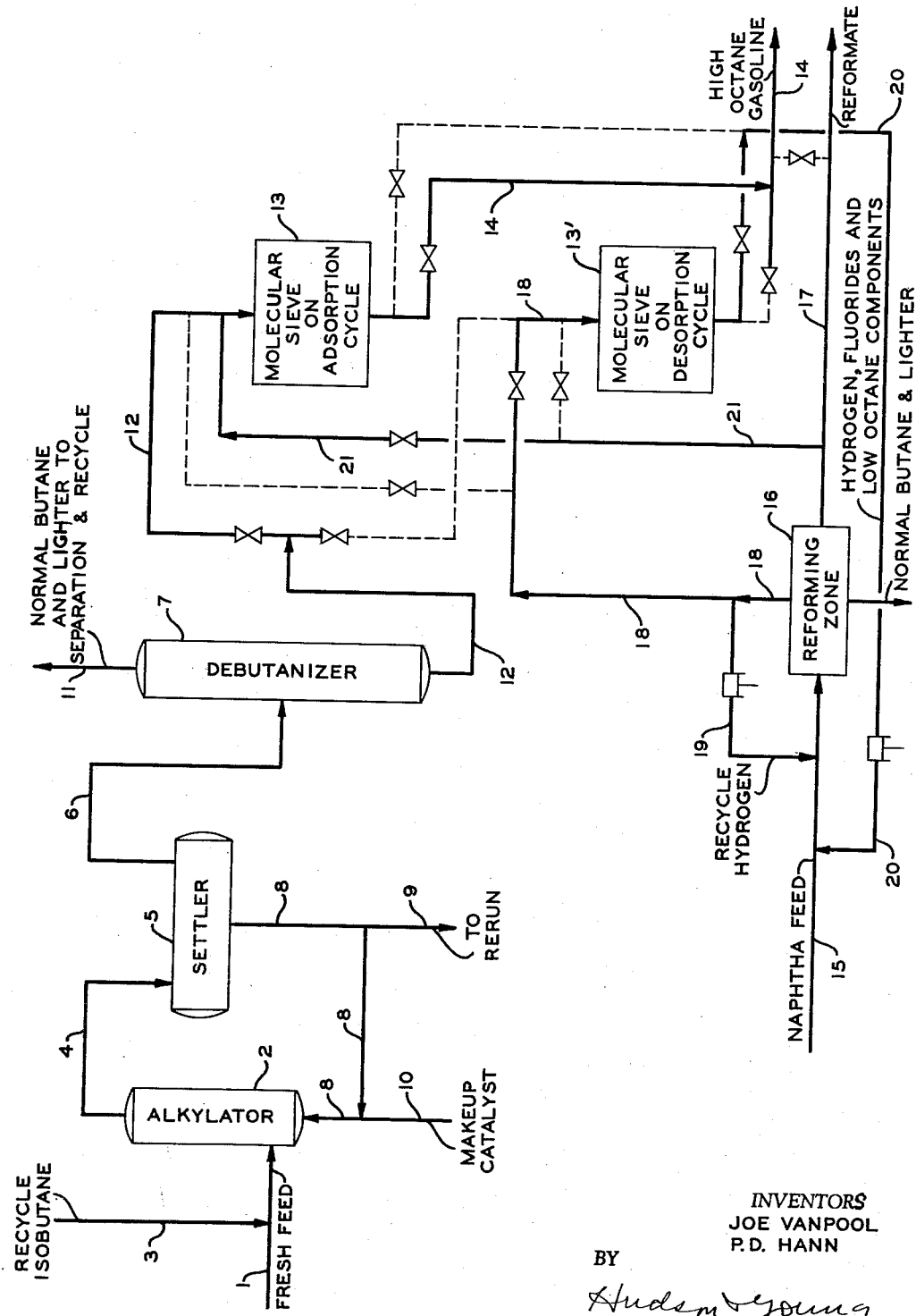

3,045,055
ALKYLATION-REFORMING WITH MUTUAL BENEFICIATION
Joe Van Pool and Paul D. Hann, Bartlesville, Okla., assignors to Phillips Petroleum Company, a corporation of Delaware
Filed Feb. 1, 1960, Ser. No. 5,886
3 Claims. (Cl. 260—683.48)

This invention relates to the alkylation of an isoparaffin and to the reforming of a hydrocarbon wherein each operation is arranged to benefit the other. In one of its aspects, the invention relates to the alkylation of an isoparaffin with an olefin in the presence of a hydrogen fluoride catalyst wherein the alkylate obtained is contacted with a molecular sieve adapted to remove therefrom organic fluorides and normal paraffin, obtaining a fluoride-free improved product suitable for use as a fuel, reforming a hydrocarbon, obtaining from the reforming a reformed product and a hydrogen stream, employing the hydrogen stream to desorb from the sieve normal paraffin and fluorides and passing the stream now containing hydrogen, organic fluorides, and normal paraffin to the reforming. In one of its embodiments, the invention relates to the alkylation of an isoparaffin with an olefin in the presence of hydrofluoric acid catalyst, the alkylation effluent is contacted with a molecular sieve to remove therefrom normal paraffins and organic fluorides, a naphtha is reformed obtaining a reformed naphtha stream and a stream of hydrogen, the stream of hydrogen is used to desorb normal paraffins, including some normal butane, from the sieve along with organic fluorides which have resulted from the alkylation operation and a stream obtained from the sieve containing the normal butane, normal paraffins, and fluorides is cycled to the reforming operation. In a further aspect of the invention, apparatus is provided comprising, in combination, an alkylator, a molecular sieve containing vessel, a reforming vessel, means for passing alkylate from the alkylator to the sieve containing vessel, means for passing hydrogen from the reforming vessel to the sieve containing vessel and means for passing a hydrogen stream from the sieve containing vessel to said reforming vessel.

We have now conceived that certain known factors which are involved in alkylation and in reforming can be so combined that the alkylation operation and the reforming operation will, each of them, contribute to the other and, therefore, result in mutual beneficiation. Thus, it has occurred to use that, by utilizing a hydrogen stream from a reforming zone to desorb a molecular sieve which has been used to upgrade an alkylation zone effluent, we can obtain a stream of hydrogen containing, say, normal paraffins, some normal butane, and organic fluorides, which stream can be returned to the reforming operation to benefit the same, the contacting of the alkylation effluent with the molecular sieve, in the first instance, resulting in an upgrading of the alkylation effluent by the removal of the normal paraffin and organic fluorides therefrom.

It is an object of this invention to provide an improved alkylation operation. It is a further object of this invention to provide an improved reforming operation. It is still a further object of the invention to provide an alkylation-reforming operation in which the alkylation operation and the reforming operation benefit each other. It is a still further object of the invention to provide a fuel suitable for use as motor fuel in a combination alkylation and reforming operation in which each of said operations benefits the other and yields a stream which can be blended with a stream from the other. It is a still further object of this invention to practice certain economies in materials handling in the alkylation and/or the reforming of hydrocarbons. It is a further object of the invention to provide a compact combination of an alkylation and a reforming operation, each of which benefits the other.

Other aspects, objects and the several advantages of the invention are apparent from a study of this disclosure, the drawing and the claims.

According to the invention, there is provided a method of preparing a hydrocarbon fuel which comprises alkylating in an alkylation zone an isoparaffin and an olefin in the presence of a hydrogen fluoride catalyst, obtaining an alkylation effluent comprising an alkylate product, organic fluorides and normal paraffin, subjecting said product to contact with a molecular sieve adapted to remove therefrom organic fluorides and normal paraffin, thus obtaining an improved alkylate product, reforming in a reforming zone a naphtha under conditions adapted to upgrade the same for use as a fuel, obtaining a reformed product which comprises upgraded naphtha and hydrogen, separating the upgraded naphtha as a product of the method, recovering a hydrogen stream, passing said stream into desorptive contact with said sieve thus obtaining a stream of hydrogen containing normal paraffin and organic fluorides, and passing the last-obtained stream to the reforming zone.

Also, according to the invention, there is provided an apparatus comprising essentially and in combination an alkylator, a sieve containing vessel and a reforming vessel and means for passing a stream of hydrogen from the reforming vessel to the sieve containing vessel to desorb paraffin and organic fluorides which have been adsorbed therein and to return said hydrogen from said sieve containing vessel to said reforming vessel.

In the drawing, there is shown diagrammatically a simplified flow plan of an operation according to the invention.

Referring now to the drawing, a fresh feed comprising isoparaffin and olefin is passed by 1 into alkylator 2 together with recycle isoparaffin, e.g., isobutane, recovered by means not shown, and returned by way of 3. Alkylation effluent passes by 4 to settler 5 wherein hydrocarbon phase is taken off the top by 6 and passed to debutanizer 7. Returning to the settler, a bottom phase containing hydrofluoric acid alkylation catalyst which has been employed is passed by 8 to alkyltor 2. As known in the art, a portion of the used acid catalyst can be passed to rerun by way of 9. Make-up or rerun acid catalyst is passed into alkylator 2 by 10 and 8.

Returning to debutanizer 7, normal butane and lighter hydrocarbons are passed by 11 to separation means and recycle not shown. Bottoms from debutanizer 7 comprising alkylation effluent are passed by 12 to molecular sieve containing zone 13 on adsorption cycle from which there is recovered by 14 a fluoride-free high octane gasoline suitable for use as a motor fuel or for blending as a motor fuel component. A low octane number or value naphtha is passed by pipe 15 into reforming zone 16 and a reformate product is obtained through 17. Hydrogen is taken off from the reforming zone 16 through 18, a portion is recycled through 19 and the remainder is passed to the top of molecular sieve containing zone 13', on desorption cycle. Hydrogen containing some normal butane, etc., and organic fluorides is removed from zone 13' and passed by 20 to 15 to zone 16. However, when the reformate does not have the characteristics which are desired and it is sought to further reform the same, some or all of the reformate can be passed through at least a portion, if not all, of the molecular sieve zone 13 to upgrade the reformate by adsorption therefrom normal paraffins, the latter being recovered from the sieve during the desorption cycle and being recycled to further reforming.

The following example tabulates, for sake of illustration, materials, products, conditions, etc.

Charge materials introduced into the alkylation zone may include propylene, butylenes, amylenes, isobutane, isopentane, propyl fluorides, butyl fluorides, amyl fluorides, etc. Charge materials introduced into the reforming zone may include naphthenic-type hydrocarbons such as 100 to 400° F. boiling range straight-run gasolines, 150 to 400° F. boiling range naphthenic hydrocarbons, etc.

Our preferred charge to alkylation is an olefin-isoparaffin hydrocarbon stream, preferably butylenes-isobutane. Preferred operating conditions for alkylation are temperatures between 80 to 100° F.; however, higher or lower temperatures can be used as is known in the art; pressure sufficient to maintain liquid phase; isobutane to olefin mol ratio above 5 to 1; and acid to hydrocarbon weight ratio of about 1 to 1; the preferred catalyst is hydrofluoric acid of at least 85 percent strength.

The preferred charge to reforming, using a platinum-type reforming catalyst known in the art, is a 150 to 400° F. naphthenic hydrocarbon; the preferred reaction conditions are temperatures of 850 to 980° F. and pressures of 280 to 800 p.s.i.g.; and hydrogen to hydrocarbon mol ratio of at least 6 to 1. Such operating conditions are known to those skilled in the art.

The molecular sieve zones on adsorption are preferably operated at ambient temperatures and at pressures to maintain liquid phase; on desorption, the preferred temperature range is 300 to 650° F. as is known in the art. The specific sieve preferred is Linde molecular sieve Type 5A, also known in the art.

Our process upgrades an alkylate produced in a conventional HF-alkylation system by removing therefrom organic fluorides and normal paraffins, using molecular sieve adsorbent, and utilizes a hydrogen-containing stream from a companion reforming operation, which reforming operation uses a platinum-containing reforming catalyst; the hydrogen-containing desorbent effluent along with the recovered organic fluorides and normal paraffins are charged to the reforming zone, the organic fluorides beneficiating the reforming catalyst and some of the normal paraffins undergoing reforming to more valuable products.

In a specific operation, presented to illustrate the value of our invention, alkylate 12 after undergoing conventional bauxite treatment for organic fluoride removal has a Research Octane Number with 3 ccs. TEL of 101.8; alkylate 12 having been treated over molecular sieve in zone 13 has a Research Octane Number with 3 ccs. TEL of 102.2, a gain of 0.4 octane numbers at this high octane level. Reformate 17 produced without the desorbed components from 13′ has a Research Octane Number with 3 ccs. TEL of 96.8; and reformate 17 produced in accordance with our invention utilizing the desorbed components from zone 13′, including organic fluorides and normal paraffins, has a Research Octane Number with 3 ccs. TEL of 97.1, a gain of 0.3 octane numbers at this high octane level.

Although the increase in octane numbers of 0.4 and 0.3 are small numerically, when operating to produce high octane components or blends, as is known in the art, a fraction of an octane number can make the difference between making and not making a competitive product.

From the foregoing description and example, it will be understood by one skilled in the art in possession of this invention that there has been provided a neat combination of steps according to the concept of the invention, the said steps permitting the beneficiation of alkylation by using, in combination therewith, a reforming zone and the beneficiation of a reforming zone by using, in combination therewith, an alkylation zone.

The temperatures, pressures, catalysts, regeneration conditions for the catalysts, etc., are all well known in the art; also, the molecular sieves, other than that mentioned in the example, can be selected by one skilled in the art in possession of this disclosure. The properties of several molecular sieves are now well known. Regeneration of the molecular sieve is also well known.

The conditions under which the most beneficiation, that is, mutual beneficiation, occurs according to the invention include the use of a hydrofluoric acid catalyst and/or a reforming zone in which an operation known as Platforming is performed.

It will be noted that the removal of the organic fluoride, employing the hydrogen stream of the reforming or Platforming operation, benefits the alkylation effluent by upgrading the same by removing therefrom organic fluorides and normal paraffin which are undesirable in a fuel. The passing of the organic fluorides to the reforming zone with the recycled hydrogen benefits the operation conducted in the reforming zone.

Reasonable variation and modification are possible within the scope of the foregoing disclosure, the drawing and the appended claims to the invention the essence of which is that there have been provided a method and apparatus wherein an alkylation effluent is upgraded by using a molecular sieve to remove therefrom organic fluorides and normal paraffins and wherein a hydrogen stream from a reforming operation is used to recapture the organic fluorides and the normal paraffin and to take these to the reforming zone, substantially as set forth and described.

We claim:

1. A method of preparing a hydrocarbon fuel which comprises alkylating in an alkylating zone an isoparaffin and an olefin in the presence of a hydrogen fluoride catalyst, obtaining an alkylation effluent comprising an alkylate product, organic fluorides and normal paraffin, subjecting said alkylate product to contact with a molecular sieve adapted to remove therefrom organic fluorides and normal paraffin, thus obtaining an improved alkylate product, reforming in a reforming zone a naphtha under conditions adapted to upgrade the same for use as a fuel, obtaining a reformed product which comprises upgraded naphtha and hydrogen, separating at least a portion of the upgraded naphtha as a product of the method, recovering a hydrogen stream, passing at least a portion of said hydrogen stream into desorptive contact with said sieve thus obtaining a stream of hydrogen containing normal paraffin and organic fluorides, and passing the last-obtained stream to the reforming zone.

2. A method according to claim 1 wherein the alkylation is conducted employing a hydrofluoric acid catalyst, the isoparaffin is isobutane and the olefin is one of propylene and butylene.

3. A method of preparing a hydrocarbon fuel which comprises alkylating in an alklating zone an isoparaffin and an olefin in the presence of a hydrogen fluoride catalyst, obtaining an alkylation effluent comprising an alkylate product, organic fluorides and normal paraffin, subjecting said alkylate product to contact with a molecular sieve adapted to remove therefrom organic fluorides and normal paraffin, thus obtaining an improved alkylate product, reforming in a reforming zone a naphtha under conditions adapted to upgrade the same for use as a fuel, obtaining a reformed product which comprises upgraded naphtha and hydrogen, separating at least a portion of the upgraded naphtha as a product of the method while passing at least another portion of said upgraded naphtha together with said alkylate product to contact with said molecular sieve, recovering a hydrogen stream, passing said stream into desorptive contact with said sieve, thus obtaining a stream of hydrogen containing normal paraffin and organic fluorides, and passing the last-obtained stream to the reforming zone.

References Cited in the file of this patent

UNITED STATES PATENTS

| | | |
|---|---|---|
| 2,542,927 | Kelley | Feb. 20, 1951 |
| 2,642,384 | Cox | June 16, 1953 |
| 2,859,173 | Hess et al. | Nov. 4, 1958 |
| 2,917,449 | Christensen et al. | Dec. 15, 1959 |
| 2,935,459 | Hess et al. | May 3, 1960 |
| 2,935,543 | Smith | May 3, 1960 |